(12) United States Patent
Yokota

(10) Patent No.: US 6,405,129 B1
(45) Date of Patent: Jun. 11, 2002

(54) METHOD OF DISPLAYING POI ICONS FOR NAVIGATION APPARATUS

(75) Inventor: Tatsuo Yokota, Torrance, CA (US)

(73) Assignee: Alpine Electronics, Inc., Tokyo (JP)

(*) Notice: Subject to any disclaimer, the term of this patent is extended or adjusted under 35 U.S.C. 154(b) by 57 days.

(21) Appl. No.: 09/725,784

(22) Filed: Nov. 29, 2000

(51) Int. Cl.$^7$ .................................................. G06F 3/00
(52) U.S. Cl. ........................ 701/208; 701/211; 701/212; 340/995; 345/634
(58) Field of Search ................................. 701/208, 211, 701/212; 340/995; 345/768, 764, 629, 634

(56) References Cited

U.S. PATENT DOCUMENTS

| | | | |
|---|---|---|---|
| 4,716,404 A | * 12/1987 | Tabata et al. ................ | 340/995 |
| 4,761,742 A | 8/1988 | Hanabusa et al. | |
| 4,847,788 A | * 7/1989 | Shimada ...................... | 340/995 |
| 6,092,076 A | * 7/2000 | McDonough et al. ....... | 345/866 |
| 6,240,360 B1 | * 5/2001 | Phelan ......................... | 345/641 |
| 6,323,885 B1 | * 11/2001 | Wiese ........................... | 340/990 |

* cited by examiner

Primary Examiner—William A. Cuchlinski, Jr.
Assistant Examiner—Eric M Gibson
(74) Attorney, Agent, or Firm—Brinks Hofer Gilson & Lione

(57) ABSTRACT

In a navigation apparatus for displaying POI (Point of Interest) icons at places on a map where points of interest are located, a map image depicting section (1) generates a map image using a single unit of map information and writes the generated map image into a video RAM, (2) then generates POI icon images and overlays the generated POI icon images on the map image for each map segment in a preset order when a total number of POI icons included in the segment is smaller than a preset number, such segments being obtained by dividing the unit of map information into n segments (where n is an integer equal to or greater than 2), or generates POI icon images and overlays the generated POI icon images on the map image for the segment in order of icon type having a larger number of POI icons when the total number of POI icons included in the segment is larger than the preset number. A map reading control section extracts an image from the video RAM which is as large as a single screen and which corresponds to a vehicle position and displays the POI icons together with the map on a display screen.

6 Claims, 8 Drawing Sheets

| COORDINATES (LONGITUDE, LATITUDE) | ICON TYPES | NAME OF ADJACENT STREET | LINKS (NODES N1,N2) | POI NAMES | --- |
|---|---|---|---|---|---|
| (x1, y1) | (ATM) | BCD, AVE | ----- | *** ATM | --- |
| ⋮ | ⋮ | ⋮ | ⋮ | ⋮ | ⋮ |
| (xi, yi) | (RESTAURANT) | ABC, AVE | ----- | BBB RESTAURANT | --- |
| ⋮ | ⋮ | ⋮ | ⋮ | ⋮ | ⋮ |
| (xn, yn) | GAS STATION | CDE, AVE | ----- | *** GAS STATION | --- |
| ⋮ | ⋮ | ⋮ | ⋮ | ⋮ | ⋮ |

BASE POLYGONS (CITY BOUNDARIES)

POINT-OF-INTEREST (POI) ICONS

FEATURE POLYGONS
(PARKS, MALLS, RIVERS, etc.)

GUIDANCE ROUTE

CITY NAMES
(IN CITY-MATCHING COLORS)

ROUTE NUMBERS

ROAD NETWORK AND STREET NAMES

GUIDANCE/MAP INFORMATION OVERLAY

METHOD OF DISPLAYING POI ICONS FOR NAVIGATION APPARATUS

BACKGROUND OF THE INVENTION

The present invention relates to a method of displaying POI (Point of Interest) icons for a navigation apparatus which displays POI icons at places on a map where points of interest are located. More particularly, the invention is directed to a method of displaying POI icons which prevents a POI icon or icons belonging to one POI icon type and appearing in a small number on a map of interest from being hidden behind POI icons belonging to another POI icon type and appearing in a larger number, by depicting the former POI icons after the latter POI icons have been depicted.

A conventional vehicle navigation apparatus reads map data for the area around where a vehicle is traveling from a map storage medium such as a CD-ROM or a DVD by detecting the position of the vehicle, and displays a map surrounding the detected vehicle position based on the read map data. Further, the vehicle navigation apparatus searches a guidance route and depicts the searched route on the map, and also superimposes a vehicle position mark on the present vehicle position which is displayed on the map. As the vehicle moves from its present position, the map is scrolled with the vehicle position mark fixed at a predetermined position on the display screen, and thus a driver can constantly check at a glance a detailed map as well as a guidance route in the area where the vehicle is currently traveling.

Such a conventional navigation apparatus includes a function of displaying an icon or icons belonging to each of three types of points of interest (POI icons) at places on a map where these three types of points of interest are located. These three types of points of interest are selected from points of interest such as an ATM (Automatic Teller Machine), a bank, a gas station, a restaurant, a hotel and a parking lot. This function helps the driver find desired points of interest on the map easily. However, for example, in an area having many restaurants, restaurant icons may conceal behind them a POI icon or icons other than the restaurant icons in some cases, while in an area where there are many hotels, a large number of hotel icons may hide behind them some POI icons other than the hotel icons. Similarly, in a business quarter where there are many banks, POI icons other than bank icons may not be seen if concealed by the bank icons.

FIG. 9 shows an example in which ATM icons, restaurant icons, and gas station icons are depicted in the stated order. In the upper left of the screen, an ATM icon is hidden behind a number of restaurant icons, and in the lower right, a restaurant icon is concealed behind a gas station icon.

SUMMARY OF THE INVENTION

Therefore, an object of the present invention is to prevent an icon or icons belonging to an icon type which appear on a map in a smaller number from disappearing behind icons belonging to another icon type which appear on the map in a larger number.

According to the present invention, the above object can be achieved by a method of displaying POI (Point of Interest) icons for a navigation apparatus which displays POI icons at places on a map where points of interest are located, which method comprises: generating POI icon images and overlaying the generated POI icon images in a memory in order of icon type having a larger number of POI icons; and extracting from the memory an image which is as large as a single screen and which corresponds to the vehicle position and displaying such image.

Further, according to the present invention, the above object is achieved by a method of displaying POI icons by which POI icons are displayed at places on a map where points of interest are located, which method comprises: (1) generating a map image using a single unit of map information and writing the generated map image into a video RAM; (2) generating POI icon images and overlaying the generated POI icon images on the map image in a preset order when the total number of POI icons included in the unit of map information is smaller than a preset number; (3) generating POI icon images and overlaying the generated POI icon images on the map image in order of icon type having a larger number of POI icons included in the unit of map information when the total number of POI icons included in the unit of map information is larger than the preset number; and (4) extracting an image from the video RAM which is as large as a single screen and which corresponds to the vehicle position and displaying such image.

Still further, according to the present invention, the above object can be achieved by a method of displaying POI icons by which POI icons are displayed at places on a map where points of interest are located, which method comprises: (1) generating a map image using a single unit of map information and writing the generated map image into a video RAM; (2) dividing the single unit of map information into n segments (where n is an integer equal to or greater than 2), generating POI icon images for each segment in order of icon type having a larger number of POI icons, and overlaying the generated POI icon images on the map image; and (3) extracting an image from the video RAM which is as large as a single screen and which corresponds to the vehicle position and displaying such image.

Still further, according to the present invention, the above object can be achieved by a method of displaying POI icons by which POI icons are displayed at places on a map where points of interest are located, which method comprises: (1) generating a map image using a single unit of map information and writing the generated map image into a video RAM; (2) generating POI icon images and overlaying the generated POI icon images on the map image for a map segment in a preset order when the total number of POI icons included in the segment is smaller than a preset number, the segment being obtained by dividing the single unit of map information into n segments (where n is an integer equal to or greater than 2); (3) generating POI icon images and overlaying the generated POI icon images on the map image in order of icon type having a larger number of POI icons included in the segment when the total number of POI icons included in the segment is larger than the preset number; and (4) extracting an image from the video RAM which is as large as a single screen and which corresponds to a vehicle position and displaying such image.

Other features and advantages of the present invention will be apparent from the following description taken in conjunction with the accompanying drawings.

DETAILED DESCRIPTION OF THE PREFERRED EMBODIMENTS

(A) Construction of Navigation Apparatus

Figure 1:
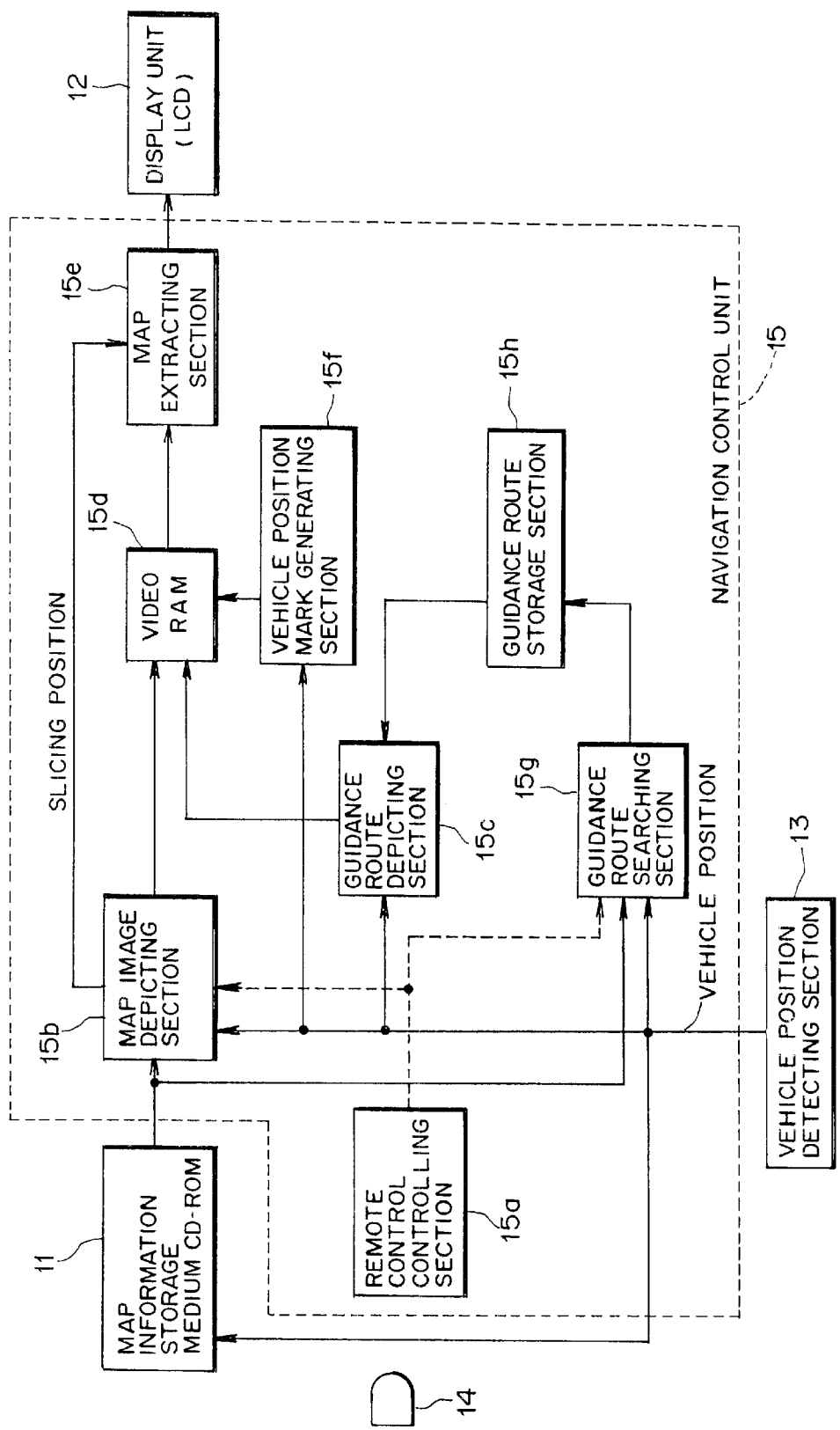
FIG. 1 is a diagram showing the construction of a navigation apparatus which utilizes a method according to the present invention.

FIG. 1 shows the general construction of a navigation apparatus which utilizes a method according to the present invention. A map information storage medium 11, such as a CD-ROM or a DVD, stores map data. A single unit (drawing) of a map is divided into appropriate longitudinal and latitudinal widths in accordance with a scale ratio. The map information includes (1) road layer information used for guidance route searching, map matching or the like, (2) background layer information for displaying an object on the map, (3) character layer information for displaying characters such as the name of a city, town or village, and (4) POI (Point of Interest) icon layer information for displaying a POI icon at a place where a POI is located. The medium 11 holds POI icon data shown in FIG. 2A for each type of POI icon layer information.

POI icon data includes:

(1) POI positions in terms of longitude and latitude coordinates in degrees (the position where a POI icon is displayed), (2) codes (POI icon codes) for specifying types of POI icons (restaurants, hotels, banks, etc.), (3) names of adjacent streets, (4) link-forming nodes for road links where points of interests are present, and (5) POI names.

Figures 2A, 2B:
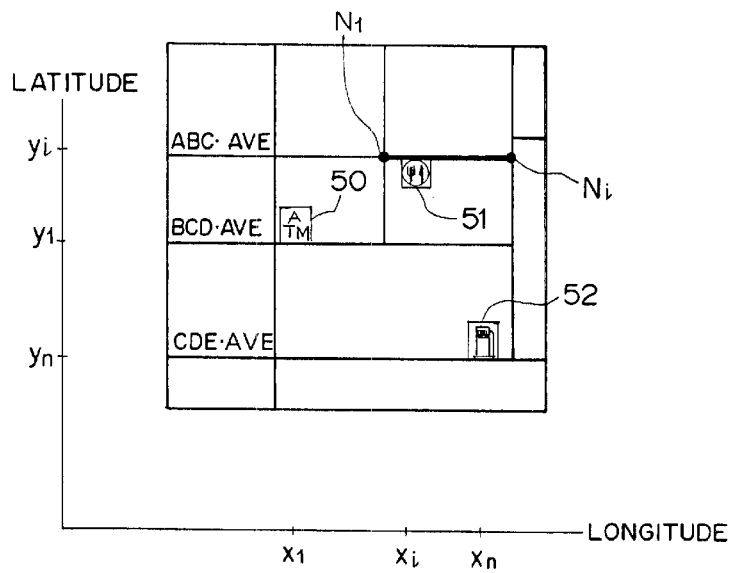
FIGS. 2A and 2B are diagrams each illustrating POI icon layer information.

In the example shown in FIGS. 2A and 2B, a POI icon 50 is displayed at a position $(x_1, y_1)$ along BCD AVE. where *ATM is located, a POI icon 51 is displayed at a position $(_i, y_i)$ along ABC AVE. where BBB restaurant is located, and a POI icon 52 is displayed at a position $(x_n, y_n)$ along CDE AVE. where *gas station is located on the map, as depicted in FIG. 2B.

Returning to FIG. 1, a navigation display unit (e.g., LCD) 12 displays a map image, POI icons, a vehicle position mark, a guidance route searched through optimal route searching, and the like according to the present vehicle position. A vehicle position detecting section 13 calculates the present vehicle position (latitude, longitude) using a direction sensor (not shown) such as a vibration gyro for detecting a direction in which the vehicle is traveling, a distance sensor for generating a single pulse at every predetermined mileage, and a GPS receiver for measuring the absolute position of the vehicle in response to an electric wave from GPS satellites. A remote control 14 is used to select a menu from various menu lists displayed on a screen and to scroll the map thereon. A navigation control unit 15 guides the vehicle to a destination by depicting a map image of the area around the present vehicle position, POI icons, the vehicle position mark, and the guidance route image based on the map data.

In the navigation control unit 15, a remote control controlling section 15a provides instructions to various sections in response to a signal corresponding to a remote control operation. A map image depicting section 15b reads map data for the area around the present vehicle position from the map storage medium 11, and generates a map image, POI icons and the like in the form of a bitmap image based on the read map data. The map data read by the section 15b covers an area wider than the maximum displayable screen range (for example, map data as large as nine screens). A guidance route depicting section 15c generates a guidance route image based on guidance route data obtained through a guidance route searching process. The guidance route data covers a route between a starting point and a destination. A video RAM 15d stores images, such as map images, POI icons, guidance route images, and vehicle position mark images. In order to have the video RAM 15d contain the appropriate image to be displayed on the screen, the map image depicting section 15b keeps updating the video RAM 15d as the vehicle travels. Further, the guidance route depicting section 15c generates guidance route images as the vehicle travels and stores the generated images into the video RAM 15d.

A map extracting section 15e extracts a map image as large as a single full screen from the video RAM 15d in a manner such that the present vehicle position coincides with a predetermined point (e.g., the center) on a display screen. The extraction position is instructed by the map image depicting section 15b. A vehicle position mark generating section 15f displays a vehicle position mark at the center of the display screen. A guidance route searching section 15g calculates a guidance route between the present vehicle position and a destination based on the route layer information included in the map data when the driver inputs the destination in a route guidance mode. A guidance route storage section 15h stores a link string constituting the guidance route between the present vehicle position and the destination.

Figure 3A:
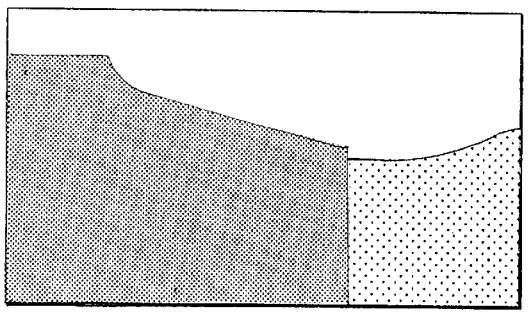
FIGS. 3A to 3H are a series of diagrams illustrating an order of storing images into a video RAM.
Figure 3E:
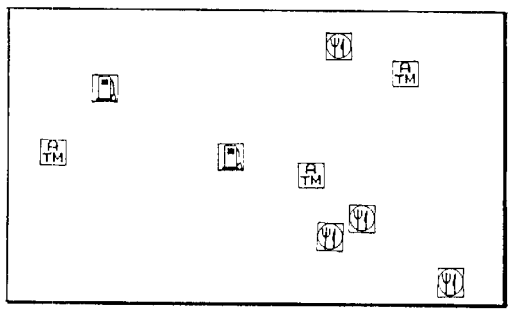
Figure 3B:
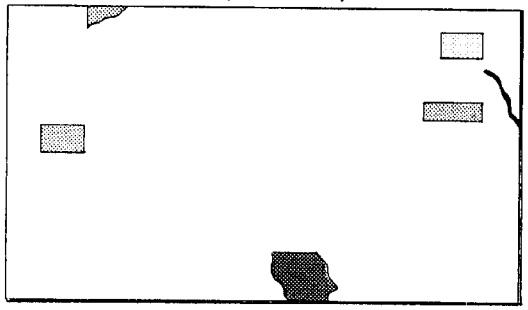
Figure 3F:
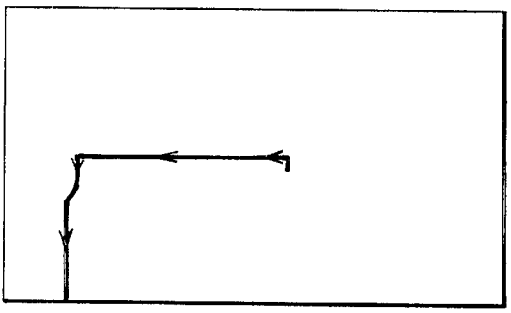
Figure 3C:
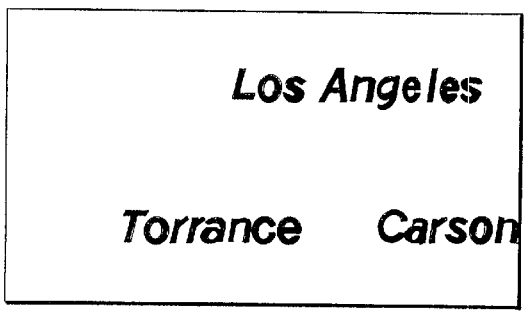
Figure 3G:
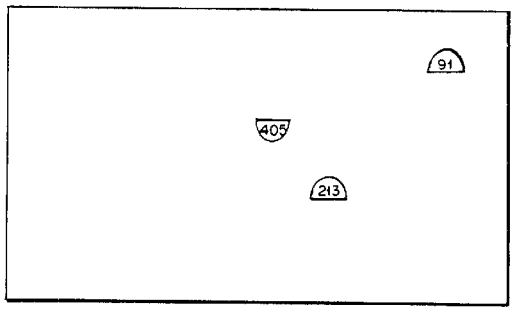
Figure 3D:
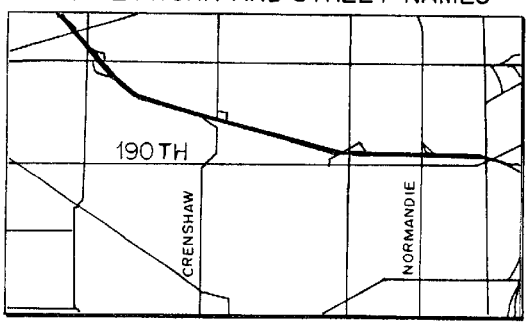
Figure 3H:
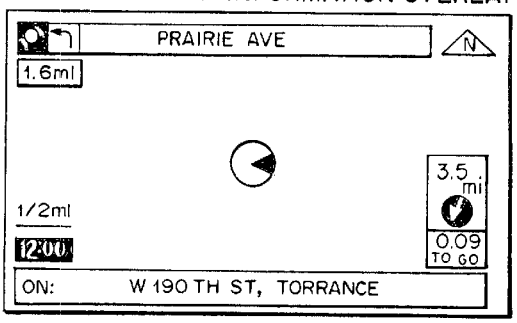

FIGS. 3A to 3H illustrate an order of storing images into the video RAM 15d. First, the map image depicting section 15b reads from the map storage medium 11 map information for the area around where the vehicle is currently located, generates base polygons (city boundaries) and writes such polygons into the video RAM 15d (FIG. 3A). Then, the section 15b generates feature polygons (FIG. 3B) such as parks, malls, rivers, etc. and writes them over the base polygons in the video RAM 15d. Thereafter, the section 15b similarly generates city names (FIG. 3C), road network and street names (FIG. 3D), POI icons (FIG. 3E), guidance route (FIG. 3F), route numbers (FIG. 3G), vehicle position mark and guidance/map information overlay (FIG. 3H) in the stated order, and writes them over the existing polygons in the video RAM 15d. In FIG. 3E, POI icons such as restaurant, gas station, and ATM icons are displayed.

(B) First Process for Generating POI Icon Images

Figure 4:
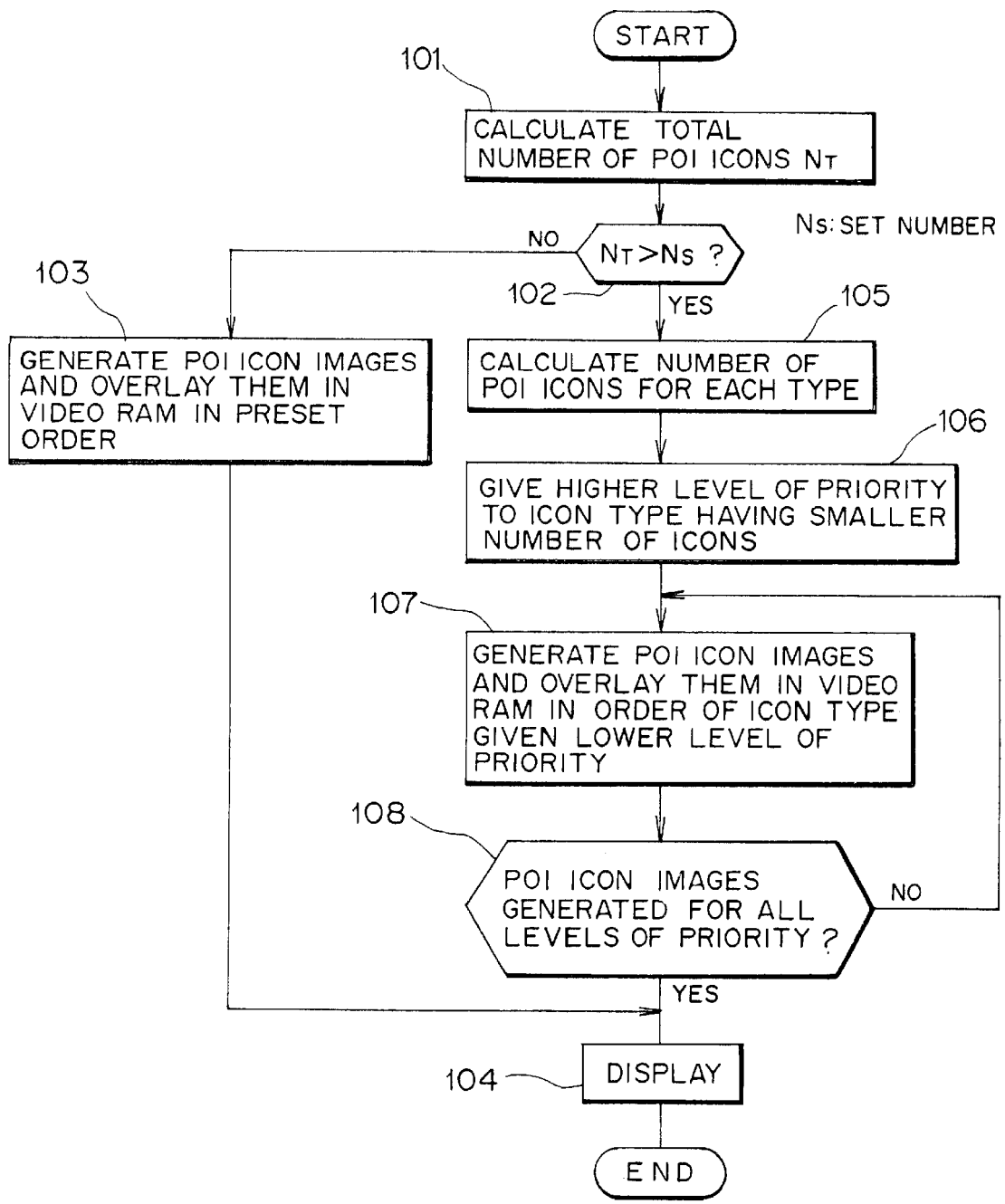
FIG. 4 is a flowchart showing a first procedure for generating POI icon images according to the present invention.
Figure 5:
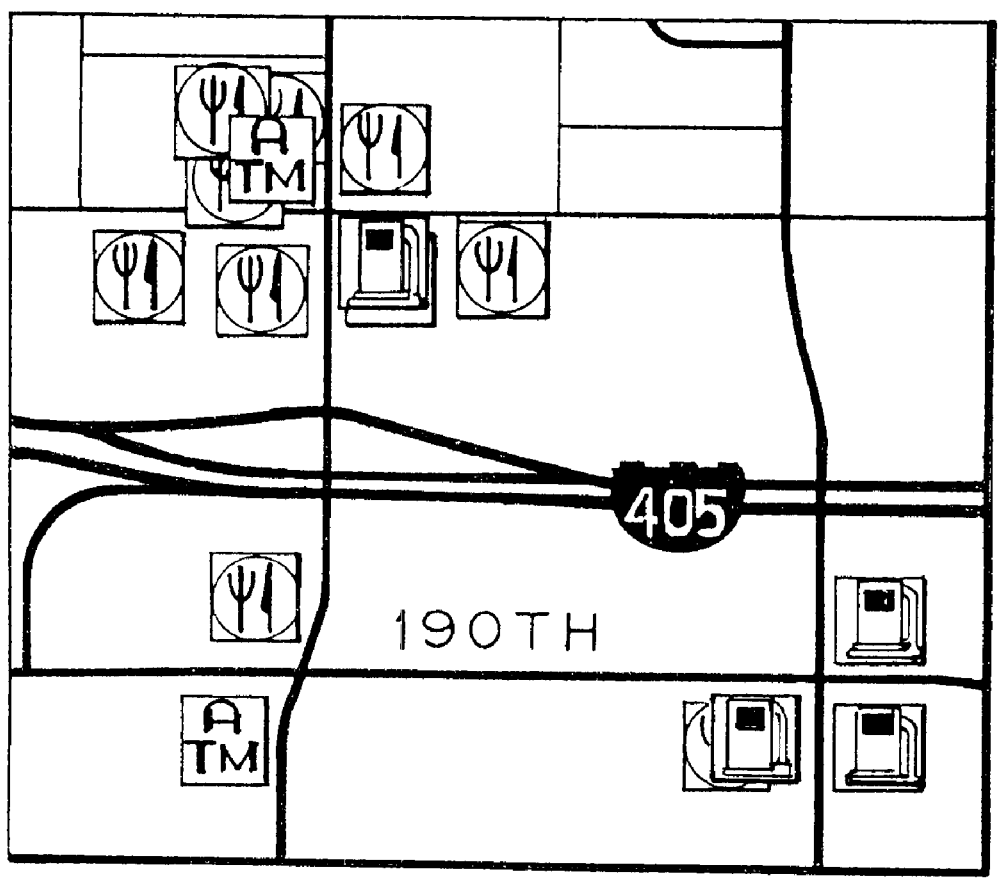
FIG. 5 is a diagram showing an example in which POI icons are depicted according to the procedure of FIG. 4.

FIG. 4 shows a first process or routine to be executed to generate POI icon images, and FIG. 5 shows an example in which POI icons are displayed according to this process.

Using the POI icon layer information (see FIG. 2A) included in a single unit (drawing) of map information, the routine calculates the total number of points of interest (the total number of POI icons) $N_T$ present in an area corresponding to such unit (Step 101). Next, the total number of POI ions $N_T$ is compared with a preset number $N_S$ (Step 102). If $N_T \leq N_S$ and thus the number of POI icons included in the single unit of map information is small, the routine generates POI icon images in a preset order, and overlays the generated icon images on the map image in the video RAM 15d (Step 103). For example, if the number of POI icons is small, the routine, deeming that a POI icon would not be concealed behind other POI icons, generates POI icon images and overlays them in the video RAM in an order specified by the POI icon layer information of FIG. 2A. Note that one may previously specify an order of icon type in which POI icon images are generated (e.g., ATM→ restaurant→ gas station) and generate the POI icon images and overlay them in the video RAM 15d in such an order. After the POI icon images have been generated in this way, the video images are read from the video RAM 15d and displayed on the display screen (Step 104).

On the other hand, if $N_T > N_S$ in Step 102, the routine generates POI icon images in order of icon type having a larger number of icons appearing on the map of interest. That is, using the POI icon layer information (see FIG. 2A), the number of POI icons is calculated for each type (Step 105), and a higher level of priority is given to an icon type having a smaller number of icons appearing on the map (Step 106). Then, the routine calculates POI icon data for each icon type which is given the lowest level of priority in sequence for all the icon types based on the POI icon layer information (FIG. 2A), and generates POI icon images and overlays them in the video RAM 15d (Step 107).

Then, a decision is made as to whether or not POI icon images have been generated for all levels of priority (Step 108). If not, the routine generates the POI icon images of Step 107, and when the POI icon images have been generated for all levels of priority, the video images are read from the video RAM 15d and displayed on the display screen (Step 104). FIG. 5 shows an exemplary display, in which the POI icon images are generated and displayed in the order of icon type having a larger number of POI icons: restaurant→ gas station→ ATM. Since the POI icon images are generated and displayed in the order of icon type having a larger number of POI icons as described above, no POI icon or icons belonging to a POI icon type which appear in a smaller number on a map of interest are likely to be hidden behind POI icons belonging to other POI icon types which appear in larger numbers.

In the above process, when the total number of POI icons included in the single unit of map information is greater than the preset number, POI icon images are generated and displayed in the order of icon type having a larger number of POI icons appearing on the map of interest. However, one may omit Steps 101 to 103, and simply generate and display POI icon images in the order of icon type having a larger number of POI icons, independently of the total number of POI icons.

Further, although a case where the process is performed on the basis of a single unit of map information has been described above, the invention is not limited thereto, and thus the process may be performed on other bases.

(C) Second Process for Generating POI Icon Images

In the first process, the order of icon type in which POI icon images are generated is determined on the basis of a single unit of map information. For this reason, in some cases when there is a POI icon type which has a small number of icon images over the entire unit but whose icon images cluster together at one place, an icon or icons belonging to other POI icon types may be hidden behind icons belonging to such a special minority POI icon type. For example, in the lower right of FIG. 5, a restaurant icon is concealed behind one of the gas station icons, possibly causing the driver to miss a restaurant. The second processing technique is intended to solve this problem.

Figure 6:
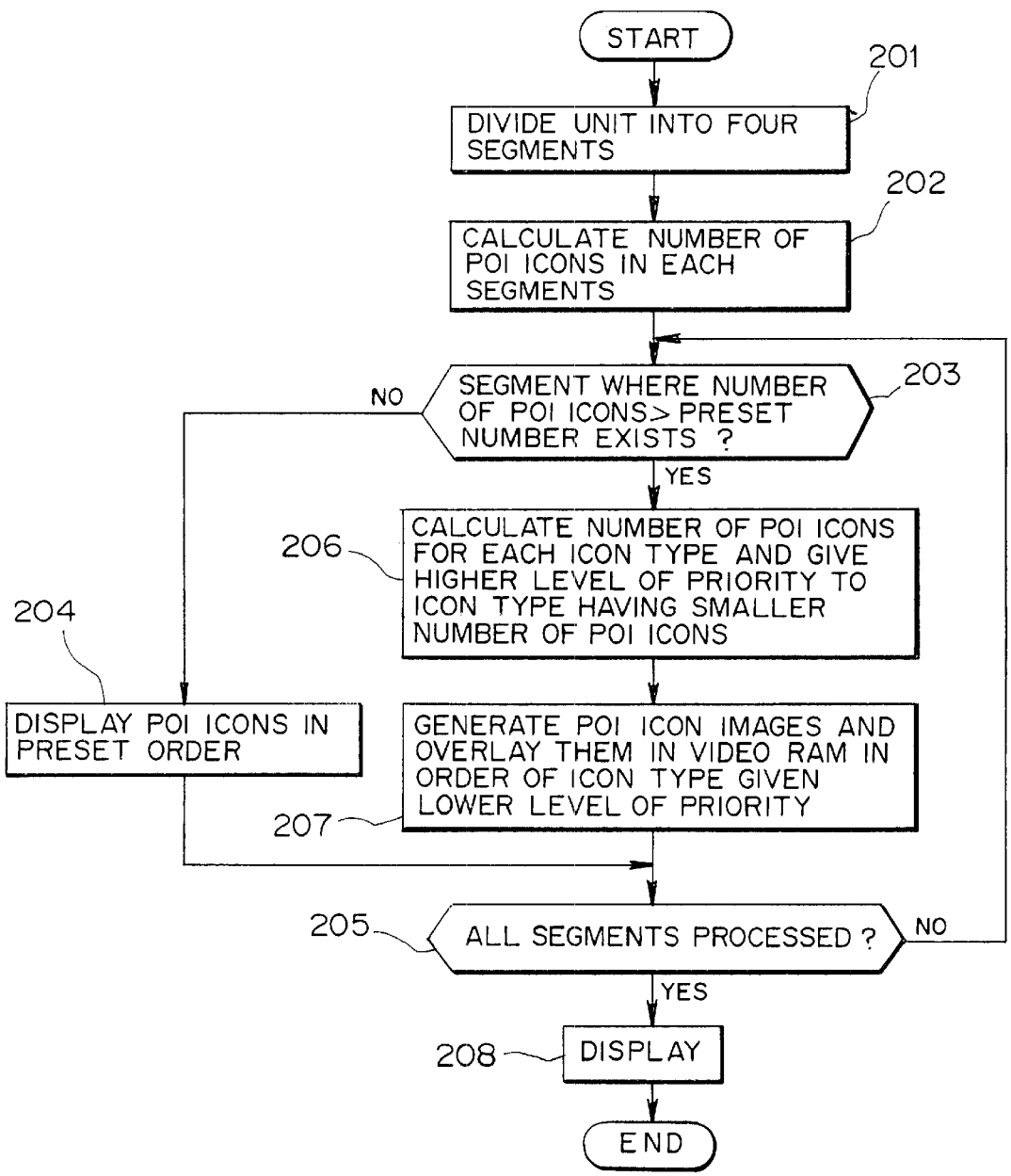
FIG. 6 is a flowchart showing a second procedure for generating POI icon images according to the present invention.
Figure 7:
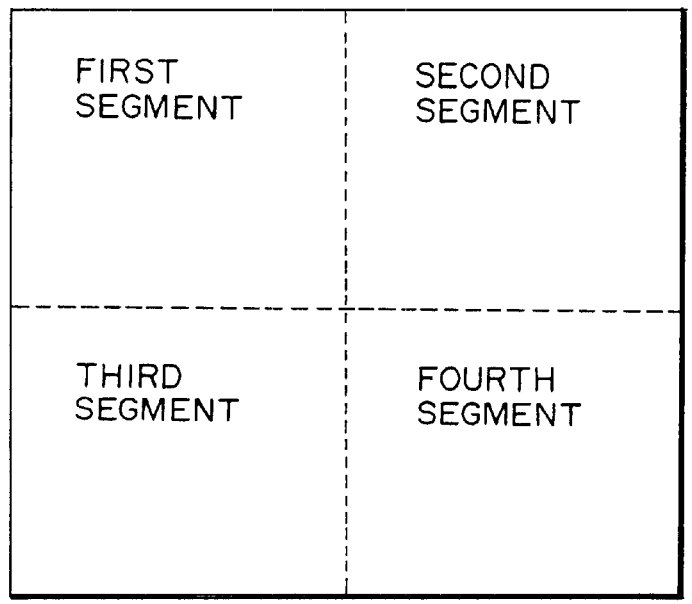
FIG. 7 is a diagram showing an exemplary division of a map unit.
Figure 8:
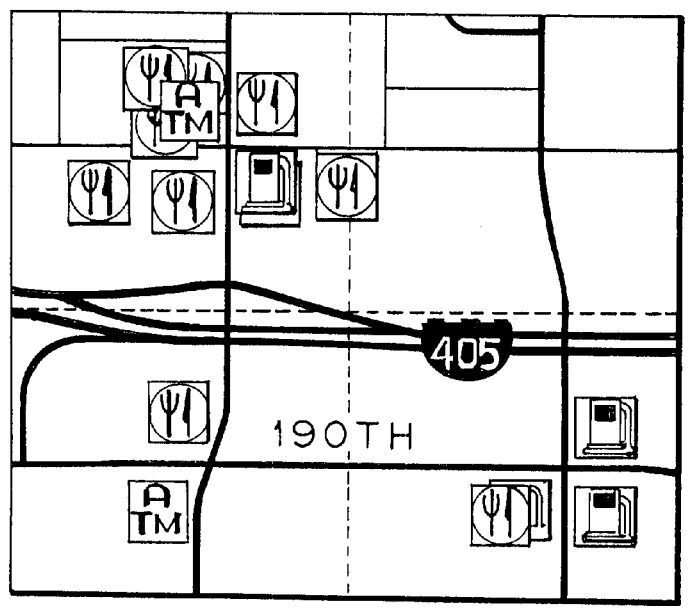
FIG. 8 is a diagram showing an example in which POI icons are depicted according to the procedure of FIG. 6.
Figure 9:
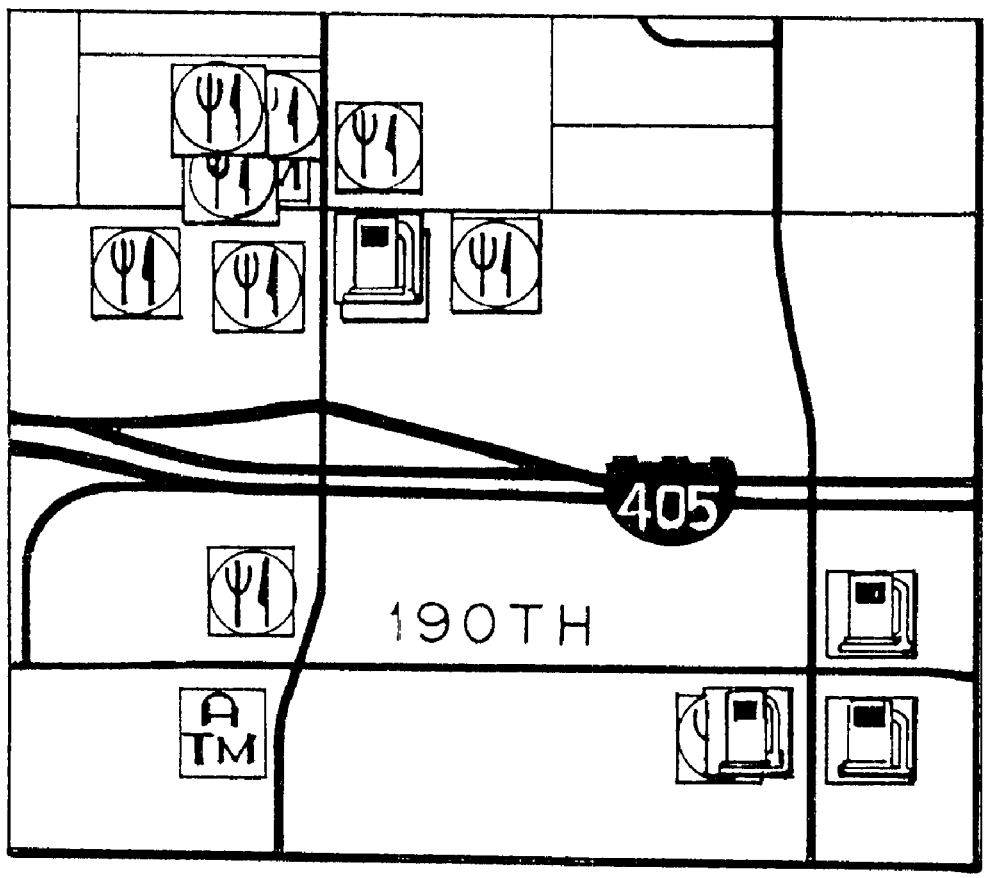
FIG. 9 is a diagram showing an example in which POI icons are depicted in the order of ATM, restaurant, and gas station icons.

FIG. 6 shows the second process or routine to be executed to generate POI icon images according to the present invention. FIG. 7 shows an exemplary division of a map unit. FIG. 8 shows an example in which POI icons are depicted according to the process of FIG. 6.

A single unit of map area is divided into n segments (where n is an integer equal to or greater than 2). For example, it is divided into four segments as shown in FIG. 7 (Step 201), and the total number of POI icons $N_{Ti}$ (i=1 to 4) is calculated for each segment by referring to the POI icon layer information (FIG. 2A) (Step 202). Then, a decision is made as to whether or not the number of POI icons $N_{T1}$ is greater than a preset number $N_{S0}$ (Step 203).

If $N_{T1} \leq N_{S0}$, then the routine generates POI icon images for a first segment in a preset order, and overlays the generated POI icon images on a map image in the video RAM 15d (Step 204). For example, when the number of POI icons in a segment is small, there likely will never be a case where a POI icon belonging to one icon type would disappear behind one or more POI icons belonging to another icon type. Thus, the routine generates POI icon images and overlays them in the video RAM 15d in a preset order of icon type (e.g., in the order of ATM→ restaurant→ gas station). Thereafter, a decision is made as to whether or not the POI icon images have been generated for all the segments (Step 205), and if not, the routine repeats Step 203 and steps subsequent thereto.

In Step 203, if $N_{Ti} > N_{S0}$ in segment i, the routine refers to the POI icon layer information (FIG. 2A) to calculate the number of POI icons for each icon type in segment i, and gives a higher level of priority to an icon type having a smaller number of POI icons appearing in that segment (Step 206). Then, the routine obtains POI icon information about an icon type which is given the lowest level of priority in sequence for all the icon types based on the above layer information, and generates POI icon images and overlays them in the video RAM 15d (Step 207). That is, the POI icon images are generated and superimposed in the video RAM 15d in order of icon type which is given a lower level of priority for all the icon types.

When all the POI icon images have been generated for segment i, a decision is made as to whether or not the POI icon images have been generated for all the segments (Step 205). If not, the routine repeats Step 203 and steps subsequent thereto. If the POI icon images have been generated for all the segments, video images are read from the video RAM 15d and displayed on the display screen (Step 208).

FIG. 8 shows an exemplary display, in which POI icon images are generated and displayed in the order of icon type having a larger number of POI icons in the first and fourth segments. This technique prevents a POI icon belonging to an icon type which appears in a smaller number from being concealed behind one or more POI icons belonging to another icon type which appear in a larger number within a segment. The second processing technique, unlike the first one, provides the advantage of displaying a POI icon belonging to one icon type which appears in a smaller number (the restaurant icon) even in the fourth segment.

In the above process, POI icons are generated and displayed in the order of icon type having a larger number of POI icons when the total number of POI icons appearing in each segment is greater than a preset number. However, one may omit Steps 202 to 204, and simply generate and display POI icon images within a segment in the order of icon type having a larger number of POI icons, independently of the total number of POI icons.

According to the present invention, POI icon images are generated and displayed in the order of icon type having a larger number of POI icons appearing on a map. This prevents a POI icon belonging to an icon type appearing in a smaller number from being hidden behind one or more POI icons belonging to another icon type appearing in a larger number on the map.

Further, according to the present invention, the map can be divided into segments, and POI icon images are generated and displayed for each segment in the order of icon type having a larger number of POI icons appearing in the segment. Therefore, even when there is a POI icon type which has a small number of icon images over the entire map unit but whose icon images cluster together at one place, an icon or icons belonging to another POI icon type will not be hidden behind the icon images of such a special minority POI icon type.

Further, according to the present invention, if the number of POI icons belonging to a POI icon type having a smaller number of icons within a map unit exceeds a predetermined threshold (for example, 10), then a decision can be made to select a part (such as 20%) of the POI icons of this type to receive a higher level of priority, while the remainder of the POI icons of this type keeps the predetermined priority for the type. This sampling factor ensures that the POI icons of other types are not exceedingly hidden behind the POI icons of the type having a smaller number within a map unit having a high density of POI icons. In this embodiment, the above process can be repeated for each POI icon type, so that an appropriate ratio of the number of POI icons for each icon type in a map unit can be maintained. Also, the percentage of the sampling may be adjusted (for example, 2% to 30%) based on the total number of POI icons in the map unit.

As many widely different embodiments of the present invention can be made without departing from the spirit and scope thereof, it is to be understood that the invention is not limited to the specific embodiments thereof except as defined in the appended claims.

What is claimed is:

1. A method of displaying POI (Point of Interest) icons on a display screen of a vehicle navigation apparatus which displays POI icons at places on a map where points of interest are located, comprising:

generating POI icon images and overlaying said generated POI icon images in a memory in order of icon type having a larger number of POI icons; and extracting an image from said memory which is as large as a single display screen and which corresponds to a vehicle position and displaying said POI icons at places where said points of interest are located on said map which is displayed.

2. A method of displaying POI (Point of Interest) icons on a display screen at places on a map where points of interest are located, comprising:

generating a map image using a single unit of map information and writing said generated map image into a video RAM;

generating POI icon images and overlaying said generated POI icon images on said map image in the video RAM in a preset order when a total number of POI icons included in said unit of map information is smaller than a preset number;

generating POI icon images and overlaying said generated POI icon images on said map image in the video RAM in order of icon type having a larger number of POI icons included in said unit of map information when said total number of POI icons included in said unit of map information is larger than said preset number; and extracting an image from said video RAM which is as large as a single display screen and which corresponds to a vehicle position and displaying said POI icons on the display screen together with said map.

3. A method of displaying POI icons according to claim 2, wherein said single unit of map information includes information about a map and POI icons in an area which is to be displayed on a single display screen at a predetermined scale ratio.

4. A method of displaying POI icons on a display screen by which POI (Point of Interest) icons are displayed at places on a map where points of interest are located, comprising:

generating a map image using a single unit of map information and writing said generated map image into a video RAM;

dividing said single unit of map information into n segments (where n is an integer equal to or greater than 2), generating POI icon images for each segment in order of icon type having a larger number of POI icons, and overlaying said generated POI icon images on said map image in the video RAM; and extracting an image from said video RAM which is as large as a single display screen and which corresponds to a vehicle position and displaying said POI icons on the display screen together with said map.

5. A method of displaying POI (Point of Interest) icons on a display screen by which POI icons are displayed at places on a map where points of interest are located, comprising:

generating a map image using a single unit of map information and writing said generated map image into a video RAM;

generating POI icon images and overlaying said generated POI icon images on said map image in the video RAM for each segment of the map unit in a preset order when a total number of POI icons included in the segment is smaller than a preset number, said segments being obtained by dividing said single unit of map information into n segments (where n is an integer equal to or greater than 2);

generating POI icon images and overlaying said generated POI icon images on said map image in the video RAM in order of icon type having a larger number of POI icons included in the segment when said total number of POI icons included in the segment is larger than said preset number; and extracting an image from said video RAM which is as large as a single display screen and which corresponds to a vehicle position and displaying said POI icons on the display screen together with said map.

6. A method of displaying POI icons according to claim 5, wherein said single unit of map information includes information about a map and POI icons in an area which is to be displayed on a single display screen at a predetermined scale ratio.

* * * * *